United States Patent
Sakamoto

(10) Patent No.: US 12,461,076 B2
(45) Date of Patent: Nov. 4, 2025

(54) QUANTITATIVE ANALYSIS METHOD AND QUANTITATIVE ANALYSIS APPARATUS

(71) Applicant: SHIMADZU CORPORATION, Kyoto (JP)

(72) Inventor: Yuki Sakamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 608 days.

(21) Appl. No.: 17/967,280

(22) Filed: Oct. 17, 2022

(65) Prior Publication Data

US 2023/0146444 A1 May 11, 2023

(30) Foreign Application Priority Data

Nov. 5, 2021 (JP) ................. 2021-180759

(51) Int. Cl.
*G01N 30/04* (2006.01)
*B01D 53/02* (2006.01)
(Continued)

(52) U.S. Cl.
CPC ....... *G01N 30/7206* (2013.01); *B01D 53/025* (2013.01); *G01N 30/8631* (2013.01); *G01N 2030/025* (2013.01)

(58) Field of Classification Search
CPC .............. G01N 30/04; G01N 30/7206
See application file for complete search history.

(56) References Cited

U.S. PATENT DOCUMENTS

2006/0218990 A1* 10/2006 Kawana ............. G01N 30/7206
73/23.37
2016/0266074 A1 9/2016 Ueno et al.
(Continued)

FOREIGN PATENT DOCUMENTS

CN 105745534 A 7/2016
JP 2002-168844 A 6/2002

OTHER PUBLICATIONS

"Basis of GC analysis 2. Analysis results 2.4. Quantification method", [Online], [Searched on Oct. 25, 2021], Shimadzu Corporation, Internet <URL:https://www.an.shimadzu.co.jp/gc/support/faq/fundamentals/quantitative_method.htm#gc_2_4 >.
(Continued)

*Primary Examiner* — John E Breene
*Assistant Examiner* — Alex T Devito
(74) *Attorney, Agent, or Firm* — Sughrue Mion, PLLC

(57) ABSTRACT

One mode of the present invention is a quantitative analysis method of quantifying a target compound contained in a sample derived from an organism, including: a category selection step of receiving selection by a user of one category containing a target sample from among categories determined in advance for the sample; a preprocessing step of performing a predetermined preprocessing including derivatization on the target sample; a measurement execution step of executing GC/MS analysis on the preprocessed target sample based on analysis condition information provided from a database storing the analysis condition information for the GC/MS analysis and calibration curve information for quantification by a standard addition method for each category; and a quantitative processing step of performing quantitative processing based on data obtained in the measurement execution step using the calibration curve information corresponding to the selected category, the calibration curve information being provided by the database.

8 Claims, 4 Drawing Sheets

(51) Int. Cl.
  *G01N 30/72* (2006.01)
  *G01N 30/86* (2006.01)
  *G01N 30/02* (2006.01)

(56) References Cited

U.S. PATENT DOCUMENTS

2018/0024100 A1* 1/2018 Sun .................. G01N 30/76
                                                      73/23.4
2019/0271617 A1* 9/2019 Nishikaze ........... C08B 37/0006

OTHER PUBLICATIONS

Ke Li et al., "Optimized GC-MS Method To Simultaneously Quantify Acetylated Aldose, Ketose and Alditol for Plant Tissues Based on Derivatization in a Methyl Sulfoxide/1-Methylimidazole System", Journal of Agricultural and Food Chemistry, 2013, pp. 4011-4018, vol. 61.
Communication dated Oct. 24, 2024 in Chinese Application No. 202211097378.9.
Leil, et al., "Methods of GC-MS and Capillary Gas Chromatography for Determining Trehalose in Plant Tissues", Plant Physiology Newsletter, Aug. 2004, vol. 4, No. 40, pp. 474-483 (15 pages).
"Scientific and technological achievements registration form", Applied Technology Achievements, Mar. 8, 2017, 10 pages.

* cited by examiner

Fig. 4

| | QUANTITATIVE VALUE [ng] | TRUE VALUE [%] |
|---|---|---|
| meso-ERYTHRITOL | 48.93 | 97.85 |
| RHAMNOSE | 47.52 | 95.04 |
| FUCOSE | 50.81 | 101.61 |
| LIPOSE | 46.96 | 93.92 |
| RIBITOL | ISTD | - |
| MANNITOL | 48.83 | 97.66 |
| TREHALOSE | 49.67 | 99.35 |
| MALTOSE | 48.66 | 97.33 |
| ISOMALTOSE | 50.73 | 101.46 |

INTERNAL STANDARD SUBSTANCE (ISTD)

Fig. 5

| | QUANTITATIVE VALUE [ng] | TRUE VALUE [%] |
|---|---|---|
| meso-ERYTHRITOL | 50.01 | 100.02 |
| RHAMNOSE | 51.10 | 102.20 |
| FUCOSE | 51.26 | 102.52 |
| LIPOSE | 52.18 | 104.37 |
| RIBITOL | ISTD | - |
| MANNITOL | 58.77 | 117.53 |
| TREHALOSE | 61.13 | 122.26 |
| MALTOSE | 70.04 | 140.09 |
| ISOMALTOSE | 61.50 | 123.00 |

INTERNAL STANDARD SUBSTANCE (ISTD)

QUANTITATIVE ANALYSIS METHOD AND QUANTITATIVE ANALYSIS APPARATUS

TECHNICAL FIELD

The present invention relates to a method and an apparatus for quantitatively analyzing an organic compound contained in a sample derived from an organism.

BACKGROUND ART

Food products derived from organisms such as agricultural products, livestock products, and marine products include organic compounds which are various metabolites such as saccharides, fatty acids, and amino acids. In recent years, development of functional foods has been activated due to an increase in health consciousness of consumers, and accordingly, there is an increasing demand for searching for useful compounds contained in various foods. In general, for qualitative or quantitative determination of such a compound contained in a sample, an analyzer such as a liquid chromatograph (LC) device, a gas chromatograph (GC) device, or a liquid chromatograph mass spectrometer (LC-MS) or a gas chromatograph mass spectrometer (GC-MS) in which these devices are combined with a mass spectrometer is widely used.

In the case of quantifying a target compound in a sample using the above analyzer, generally, either an external standard method (also referred to as absolute calibration curve method) or an internal standard method is used as a quantitative method (see Non Patent Literature 1 and the like).

In the external standard method, standard samples containing a target compound prepared to have known concentrations are analyzed by an analyzer to acquire an area or a height of a chromatographic peak corresponding to the target compound, and a calibration curve showing a relationship between the concentration and the area (or height) is prepared in advance. Thereafter, a concentration value is calculated from the area (or height) value of the chromatogram peak corresponding to the target compound obtained by analyzing an unknown sample with reference to the calibration curve.

On the other hand, in the internal standard method, standard samples containing a target compound and an internal standard substance, which has a completely separated peak from the target compound peak on a chromatogram, at known concentrations are analyzed by an analyzer. The ratio in area (or in height) of chromatographic peaks between the target compound and the internal standard substance is acquired, and a calibration curve showing a relationship between the concentrations and the area ratios is prepared in advance. Thereafter, a concentration value of the target compound in an unknown sample is calculated from the area ratio of the peaks obtained by analyzing the unknown sample to which the internal standard substance having a known concentration has been added with reference to the calibration curve.

In the internal standard method, there is a complication that it is necessary to prepare an internal standard substance whose peak does not overlap with those of compounds originally contained in the unknown sample on the chromatogram, but there is an advantage that an error in a supply amount of the sample that may occur in the external standard method can be corrected.

CITATION LIST

Patent Literature

Patent Literature 1: JP 2002-168844 A

Non Patent Literature

Non Patent Literature 1: "Basis of GC analysis 2. Analysis results 2.4. Quantification method", [Online], [Searched on Oct. 25, 2021], Shimadzu Corporation, Internet
Non Patent Literature 2: Ke Li et al., 8 "Optimized GC-MS Method To Simultaneously Quantify Acetylated Aldose, Ketose and Alditol for Plant Tissues Based on Derivatization in a Methyl Sulfoxide/1-Methylimidazole System", Journal of Agricultural and Food Chemistry, 2013, Vol. 61, pp. 4011-4018

SUMMARY OF INVENTION

Technical Problem

Food samples such as agricultural products, livestock products, and marine products contain a large number of various compounds in addition to target organic compounds such as saccharides to be quantified. Therefore, due to the matrix effect by such impurities other than the target compound, the response when the unknown sample is analyzed is greatly different from the response to the standard sample at the time of preparing the calibration curve, and the accuracy of the quantitative value is often impaired. Since a degree of the matrix effect varies depending on the combination of a plurality of contaminants in the sample and the content thereof, a degree of difference in response varies depending on the type of food sample and the like, and in some cases, reliable quantitativity may not be obtained.

As a method for solving such a problem, there is a standard addition method in which target compounds having known concentrations are added to specimens (unknown samples) to create a calibration curve, and the concentration of the target compound in the specimen is obtained from the calibration curve. It is also described in Non Patent Literature 1 and Patent Literature 1 that the standard addition method is effective in reducing the matrix effect.

However, in the standard addition method, in order to create the calibration curve, it is necessary to prepare a plurality of standard samples by adding a plurality of concentrations of a target compound to each unknown sample, and analyze the plurality of standard samples. That is, even if the target compound is the same, it is necessary to perform an operation of creating a calibration curve for each unknown sample. Further, in the case of quantifying a plurality of target compounds contained in a sample, if the concentrations of the target compounds originally contained in the sample greatly vary depending on the compounds, concentration calculation for the plurality of target compounds may not be performed by one standard addition method. In that case, it is necessary to create a calibration curve by the standard addition method while changing a range of the known concentration to be added to the sample for each target compound.

Thus, it takes considerable time and effort to prepare and analyze a sample for quantifying a plurality of target compounds in an unknown sample. In particular, in the case of quantifying a saccharide or the like using gas chromatography, it takes time and effort to preprocess a sample including derivatization, and thus, it takes much time and effort to quantify a plurality of kinds of compounds for a large number of unknown samples.

The present invention has been made to solve the above problems, and a main object of the present invention is to provide a quantitative analysis method and apparatus capable of obtaining a quantitative result with practically sufficient accuracy while reducing a burden of sample preparation and analysis work necessary for creating a calibration curve by the standard addition method for each unknown sample, which is complicated and time-consuming by a user.

Solution to Problem

One mode of a quantitative analysis method according to the present invention made to solve the above problems is a quantitative analysis method of quantifying a target compound contained in a sample derived from an organism, the quantitative analysis method including:

a category selection step of receiving selection by a user of one category including a target sample from among a plurality of categories determined in advance for the sample;

a preprocessing step of performing a predetermined preprocessing including derivatization on the target sample;

a measurement execution step of executing gas chromatograph mass spectrometry on a preprocessed target sample preprocessed by the preprocessing step based on analysis condition information provided from a database storing the analysis condition information for the gas chromatograph mass spectrometry and calibration curve information for quantification by a standard addition method for each of the plurality of categories; and a quantitative processing step of performing quantitative processing based on data obtained in the measurement execution step using the calibration curve information corresponding to the category selected in the category selection step, the calibration curve information being provided by the database.

One mode of a quantitative analysis apparatus according to the present invention made to solve the above problems is a quantitative analysis apparatus configured to quantify a target compound contained in a sample derived from an organism, the quantitative analysis apparatus including:

a database storing analysis condition information for gas chromatograph mass spectrometry and calibration curve information for quantification by a standard addition method for each of a plurality of categories determined in advance for the sample;

a category selection unit configured to receive selection by a user of one category including a target sample from among the plurality of categories;

a measurement unit configured to execute the gas chromatograph mass spectrometry on the target sample subjected to predetermined preprocessing based on the analysis condition information provided by the database; and a quantitative processing unit configured to perform quantitative processing based on data obtained by the measurement unit using the calibration curve information corresponding to one category selected by the category selection unit provided by the database.

Advantageous Effects of Invention

According to the above mode of the quantitative analysis method and the quantitative analysis apparatus according to the present invention, it is possible to reduce the burden of sample preparation and analysis work required for creating a calibration curve by the standard addition method for each unknown sample, which is complicated and time-consuming by the user, while ensuring practically sufficient quantitative accuracy. Thereby, for example, quantitative analysis of a plurality of kinds of saccharides with respect to a large amount of unknown samples can be performed in an efficient and labor-saving manner.

BRIEF DESCRIPTION OF DRAWINGS

FIG. 4 is a diagram illustrating an example of a quantitative result of saccharides when a calibration curve based on food samples of the same category as that of an unknown sample is used.

FIG. 5 is a diagram illustrating an example of a quantitative result of saccharides when a calibration curve based on food samples of a category different from that of an unknown sample is used.

DESCRIPTION OF EMBODIMENTS

[Sample and Compound to be Quantified]

Figure 1:
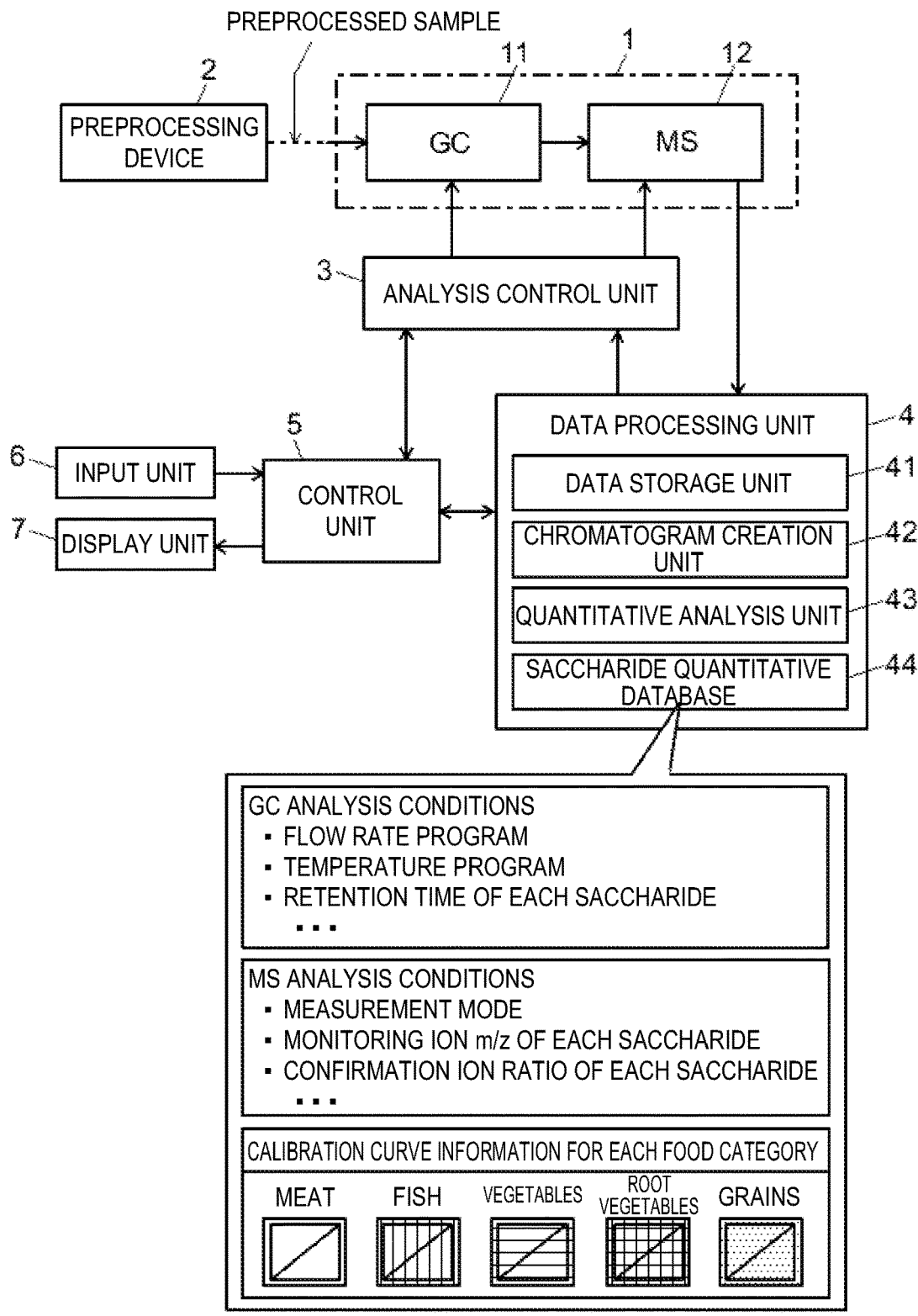
FIG. 1 is a schematic configuration diagram of a saccharide quantitative analysis system according to an embodiment of the present invention.

In the above mode of the quantitative analysis method and the quantitative analysis apparatus according to the present invention, the "organism" of the "sample derived from an organism" may include a plant, an animal (including a human), and a microorganism.

Further, the "sample derived from an organism" is specifically, for example, a food sample derived from an organism, and is an agricultural product such as vegetables (leaf and stem vegetables, root vegetables, fruits and vegetables, fruity vegetables, flavorful vegetables, and the like), fruits, mushrooms, and grains, a livestock product which is mainly meat, a marine product which is mainly fish, or the like. Further, agricultural products, livestock products, and marine products are usually unprocessed or have a low degree of processing, that is, raw materials themselves or food samples close to them, but here, for example, processed products subjected to processes such as fermentation and drying can be included.

Further, the "sample derived from an organism" can include a sample derived from an organism, for example, blood, urine, sweat, body fluid, or the like collected from a human, or for example, plasma or the like extracted from it, in addition to the food sample.

In the above mode of the quantitative analysis method and the quantitative analysis apparatus according to the present invention, the "plurality of categories" differs depending on the type of the "sample derived from an organism". For example, in a case where the "sample derived from an organism" is a food sample as described above, for example, each of the agricultural products, livestock products, and marine products can be regarded as one category. Further, the agricultural products can be divided into categories such as vegetables, fruits, mushrooms, and grains, and can be further divided into more detailed categories such as leaf and stem vegetables, root vegetables, fruits and vegetables, fruity vegetables, and flavor vegetables. Further, a plurality of categories divided in this manner may be collectively defined as one category. Further, the marine products can be similarly divided into categories such as fish, seashells, and crustaceans.

These categories can be basically set according to taxonomic classifications such as animal taxonomy and plant taxonomy, but it is not essential. For example, in vegetables and the like, in general, not only characteristics as plants but also classification from the viewpoint of cultivation are considered, and categorization according to this is also possible. Of course, not only the categorization based on such a theoretical or academic definition but also the categorization based on experimental verification can be performed.

It is desirable that a correspondence relationship between the type of each sample (for example, a certain type of vegetable) and the category is easily understood. This is because, when the user selects a category in which a target sample is included, it is not appropriate to spend time in hesitation in the selection. Therefore, when the user determines that a certain sample is included in a certain category in common sense, it is not necessarily guaranteed that the calibration curve information associated with the category is the calibration curve information having the best quantitativity for the sample (That is, there may be a case where the quantitativity is higher when calibration curve information associated with another category is used.).

Further, in the quantitative analysis method and the quantitative analysis apparatus according to the above mode of the present invention, the "target compound" to be quantified is an organic compound that can be contained in a sample derived from an organism, and is typically a metabolite (usually a secondary metabolite) such as a saccharide, a fatty acid, or an amino acid. However, in general, a method of quantifying fatty acids and amino acids using LC/MS analysis or the like is effective, but it is difficult to sufficiently quantify saccharides by such a method. Thus, it can be said that the present invention is particularly effective for quantification of a plurality of kinds of saccharides contained in a sample derived from an organism.

[Method of Measuring Sample]

In general, LC-MS is often used for analysis of organic compounds in food samples. Many isomers of saccharides are structurally similar, and they are difficult to separate in a mass-to-charge ratio (m/z). Therefore, separation by chromatography is important. In order to obtain high separation performance by chromatography using LC or LC-MS, a long analysis time of 1 hour or longer is usually required. On the other hand, in GC-MS, as with LC-MS, isomers of saccharides cannot be separated at m/z, but separation performance of chromatography is high, and separation with a smaller half-value width than that of LC is possible. Therefore, multi-component simultaneous analysis can be performed in a relatively short analysis time. Therefore, in the above mode of the present invention, GC/MS analysis is used as a measurement method for a sample.

As is well known, since a gas chromatograph-tandem mass spectrometer (GC-MS/MS) can perform two-stage mass separation, it is excellent in separation of saccharides and other contained components in a food sample, and is advantageous for reducing a lower detection limit and expanding a dynamic range. Therefore, more preferably, GC/MS/MS is used as a measurement method for the sample.

[Quantitative Analysis Method and Apparatus According to One Embodiment of the Present Invention]

An embodiment of a quantitative analysis method and a quantitative analysis apparatus according to the present invention will be described in detail below.

In this embodiment, quantitative analysis of a plurality of kinds of saccharides in a food sample mainly including agricultural products, livestock products, and marine products is performed.

<Outline of Quantitative Analysis Method>

Figure 3:
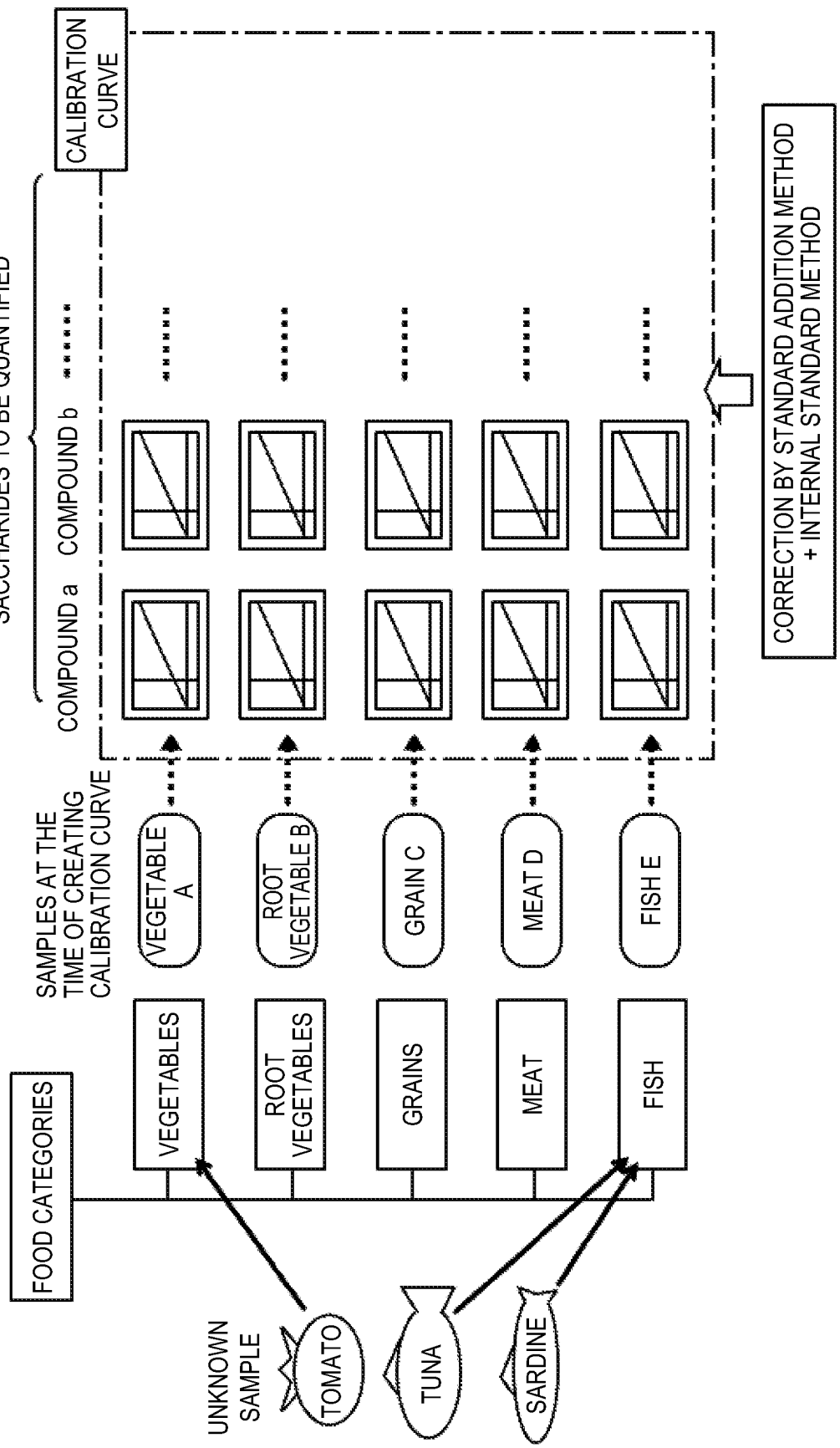
FIG. 3 is an explanatory diagram of an outline of a quantitative analysis method performed using the saccharide quantitative analysis system of the present embodiment.

FIG. 3 is a schematic diagram for explaining the quantitative analysis method of the present embodiment.

In general, when quantitative analysis is performed using an analyzer such as GC, LC, GC-MS, or LC-MS, it is necessary to create a calibration curve using a standard sample prior to quantification of an unknown sample. However, as described above, the food sample contains various components other than the target saccharide, and the matrix effect due to such impurities becomes a problem. In order to reduce the matrix effect, it is desirable to use the standard addition method as a quantitative method, but preparing a standard sample for each unknown sample and creating a calibration curve puts a heavy burden on the user. Therefore, in this quantitative analysis method, a calibration curve by the standard addition method used for performing quantification is created in advance on a manufacturer side, is stored in a database, and is provided to the user.

However, the number of types of foods desired to be quantitatively analyzed by the user is enormous, and it is not realistic to create a calibration curve by the standard addition method for each type of all the foods on the manufacturer side because the amount of work is enormous. Of course, if the types of food that can be quantified are considerably limited, it is possible to prepare a calibration curve for each type of food, but such an apparatus has poor versatility. Therefore, in the quantitative analysis method of the present embodiment, a plurality of (five in the example of FIG. 3) food categories that can include various foods are determined, and a calibration curve is prepared for each food category and each target compound on the manufacturer side. A user designates a food category including a target sample prior to quantification, and performs quantitative analysis on the target sample using a calibration curve associated with the food category.

As illustrated in FIG. 3, in this quantitative analysis method, five categories of vegetables, root vegetables, grains, meat, and fish are defined as food categories. The vegetables mentioned herein include leaf and stem vegetables, fruits and vegetables, fruity vegetables, and flavor vegetables, excluding root vegetables. An operator in charge of creating a calibration curve (usually, a person in charge of a device manufacturer or a developer and manufacturer of software installed in the device) prepares a representative food sample (vegetable A, root vegetable B, grain C, meat D, and fish E in FIG. 3) for each food category, and creates a calibration curve using the food sample according to the following procedure.

When a saccharide is subjected to the GC/MS analysis, the saccharide cannot be sufficiently separated as it is, and thus preprocessing including derivatization is performed. A specific procedure of the preprocessing will be described later.

An operator divides a plurality of food samples (for example, vegetable A) for creating a calibration curve. Then, a plurality of kinds of compounds (saccharides) a, b, . . . to be quantified are added to the divided food sample at known concentrations, and the concentrations of the target compounds a, b, . . . to be added are changed in a plurality of stages to prepare a plurality of standard samples. The plurality of standard samples prepared in this way and the food samples to which the compounds a, b, . . . are not added are preprocessed, and the preprocessed samples thus obtained are each measured by GC-MS under predetermined analysis conditions (GC analysis conditions and MS analysis conditions) to acquire data.

In the preprocessing, a predetermined internal standard substance is also added to the sample. This is because the calibration curve is created using the ratio in area (or in height) of chromatographic peaks between the compounds a, b, . . . and the internal standard substance, rather than the areas (or heights) of chromatographic peaks of the compounds a, b, . . . . Accordingly, it is possible to create a calibration curve having a function of correcting a difference in the recovery rate of the compound at the time of preprocessing. That is, although the calibration curve created here is basically a calibration curve by the standard addition method, it can be considered that the calibration curve is substantially a combination of the internal standard method and the standard addition method. It is known in Patent Literature 1 and the like that such an internal standard method and a standard addition method are used in combination.

The information of GC analysis conditions at the time of analysis include information on the retention time corresponding to each of the compounds a, b, . . . and the internal standard substance, and the information of MS analysis conditions include m/z value information of the monitoring ion corresponding to each of the compounds a, b, . . . and the internal standard substance. In the GC/MS analysis, corresponding to each of the compounds a, b, . . . and the internal standard substance, extracted ion chromatogram data at an m/z value corresponding to the compound and the internal standard substance in a predetermined time range around the retention time at which the compound and the internal standard substance are observed is acquired. As a result, a ratio between the chromatographic peak area of each of the compounds a, b, . . . and the chromatographic peak area of the internal standard substance can be obtained from the extracted ion chromatogram. Then, a calibration curve is created from the relationship between the concentration of each of the compounds a, b, . . . in the plurality of standard samples and the peak area ratio, and information on the slope of the calibration curve, specifically, a gradient coefficient of the linear equation or the quadratic equation is acquired as calibration curve information.

As a result, as illustrated in FIG. 3, calibration curve information for each of compounds a, b, . . . is obtained for each food sample for creating a calibration curve such as vegetable A. Although there is a difference in the recovery rate at which each compound is extracted during preprocessing depending on the type of sample, it is possible to obtain a calibration curve in which the difference in the recovery rate is corrected by using the peak area ratio, that is, by using the internal standard method. For example, the device manufacturer side creates a database of the calibration curve information thus obtained as calibration curve information corresponding to each food category, and provides the database to the user.

When the user desires to quantify compounds a, b, . . . contained in a target sample (unknown sample), the user selects a food category containing the target sample. As illustrated in FIG. 3, when the target sample is tomato, the category of vegetables may be selected, and when the target sample is tuna or sardine, the category of fish only needs to be selected. Then, the user performs prescribed preprocessing on the target sample, measures the target sample that has been preprocessed by GC-MS under predetermined analysis conditions (GC analysis conditions and MS analysis conditions), and acquires data.

The preprocessing is specified by the device manufacturer, and is basically the same as the preprocessing performed at the time of creating the calibration curve. Therefore, a predetermined concentration of the internal standard substance is added to the target sample during the preprocessing. Further, the analysis conditions in the GC-MS are also specified by the device manufacturer, and are basically the same analysis conditions as the GC/MS analysis performed at the time of creating the calibration curve.

By the GC/MS analysis on the target sample, the extracted ion chromatogram data at the m/z value corresponding to the compound and the internal standard substance in a predetermined time range around the retention time at which the compound and the internal standard substance are observed is obtained corresponding to the compounds a, b, . . . and the internal standard substance. From the extracted ion chromatogram, a ratio of the chromatographic peak area of each of the compounds a, b, . . . to the chromatographic peak area of the internal standard substance is obtained. The concentration of each of the compounds a, b, . . . associated with the food category selected first is calculated by comparing the value of the peak area ratio with the calibration curve information of each of the compounds a, b, . . . .

Accordingly, in the quantitative analysis method of the present embodiment, various saccharides contained in the food sample can be quantified using the calibration curve created in advance by the device manufacturer without creating the calibration curve based on the standard addition method that is complicated and takes time on the user side. Since the calibration curve used at this time is created by the standard addition method, the matrix effect due to various contaminants other than the saccharides contained in the food can be reduced. Further, since the internal standard method is also used at the time of creating the calibration curve, it is possible to correct the difference in the recovery rate of the compound in the preprocessing.

Furthermore, in the quantitative analysis method of the present embodiment, since a large number of food samples are categorized and calibration curve information is stored in the database for each food category and used, it is possible not only to reduce labor and time required for creating a calibration curve but also to provide highly versatile quantitative analysis for various foods not limited to specific types of foods.

In the quantitative analysis method, the following modifications can be made.

Some saccharides, such as the major saccharides glucose, fructose, sucrose, and the like, may originally be included in the food product derived from an organism at relatively high concentrations. Therefore, when a calibration curve for such a compound is created, the concentration of the compound in the standard sample to be used is high, and the accuracy of the calibration curve may decrease particularly in a low concentration range. Therefore, for some specific compounds, a calibration curve is obtained using stable isotopes of the compounds including stable isotopes having a small abundance ratio such as deuterium ($^2H$) or carbon 13 ($^{13}C$) instead of isotopes having the largest abundance ratio, and a gradient coefficient of the calibration curve is stored in a database as calibration curve information.

At the time of quantifying the compound in the target sample, the stable isotope having a small abundance ratio of the compound is selectively detected, and the concentration is calculated by comparing the peak area ratio of the stable isotope with the calibration curve information. As a result, as described above, even for a compound having a high concentration contained in food, that is, regardless of the concentration of the compound contained in food, quantification can be performed in a wide dynamic range.

<Specific Example of Preprocessing Method>

Here, a specific example of the preprocessing when the food sample is subjected to the GC/MS analysis will be described. Of course, the preprocessing adoptable in the quantitative analysis method of the present embodiment is not limited to this.

This preprocessing can be roughly divided into two steps of a component extraction step and a derivatization step.

(1) Component Extraction Step

First, a specified amount of a freeze-dried food sample is weighed, and a predetermined amount of a solvent (for example, a mixed solvent of water, methanol, and chloroform (1:2.5:1)) and an internal standard substance are added. As an example, ribitol or a stable isotope of a saccharide that is not used for creating a calibration curve can be used as the internal standard substance. Thereafter, the food sample to which the solvent or the like has been added is shaken under a temperature condition of 37° C. for 20 minutes to dissolve the compound contained in the food sample in the solvent. The solution is then centrifuged at 16,000 g and the supernatant is collected. Ultrapure water is added to the collected supernatant, and the mixture is stirred and centrifuged again, and then a prescribed amount of supernatant is collected. The collected supernatant is freeze-dried to obtain an extraction sample, and the component extraction step is completed.

(2) Derivatization Step

Dimethylsulfoxide (DMSO) as a solvent is added to the lyophilized extraction sample, and the mixture is sufficiently stirred to dissolve components in the extraction sample in the solvent. Here, by using DMSO, which is an aprotic solvent, as the solvent, it is possible to prevent epimerization and isomerization in which the configuration of an asymmetric carbon is reversed. Thereafter, 1-methylimidazole and acetic anhydride as derivative reagents are added to the solution, the mixture is stirred, and then left to stand at room temperature for 10 minutes to accelerate a derivatization (acetylation) reaction. Thereafter, the derivatization reaction is stopped by adding ultrapure water to the solution, the derivatized component is extracted using an organic solvent such as dichloromethane, and the derivatization step is terminated.

As reported in Non Patent Literature 2 and the like, a plurality of peaks appearing in the chromatogram corresponding to a plurality of stereoisomers of the same compound can be gathered into one peak by using DMSO as a solvent in performing derivatization. Further, by combining 1-methylimidazole with acetic anhydride as a derivative reagent, the efficiency of the derivatization reaction can be increased.

<Configuration and Operation of One Example of Quantitative Analysis System>

Figure 2:
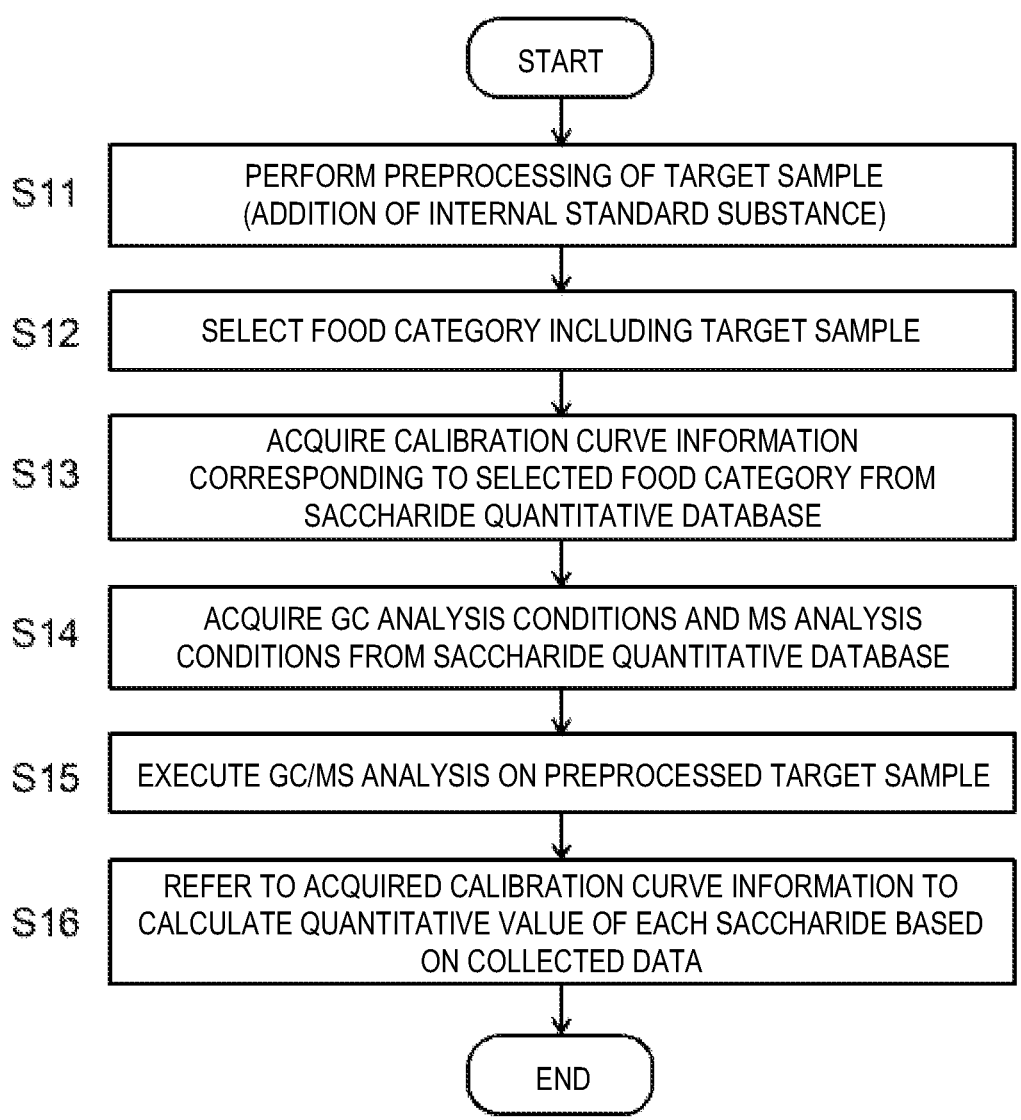
FIG. 2 is a flowchart illustrating a procedure and a flow of processing of quantitative analysis of a saccharide performed using the saccharide quantitative analysis system of the present embodiment.

FIG. 1 is a schematic block configuration diagram of an example of a saccharide quantitative analysis system using GC-MS capable of performing the above-described quantitative analysis method. Further, FIG. 2 is a flowchart illustrating a procedure and a flow of processing of quantitative analysis using the saccharide quantitative analysis system.

As illustrated in FIG. 1, the saccharide quantitative analysis system includes a preprocessing device 2, a measurement unit 1 including a gas chromatograph (GC) unit 11 and a mass spectrometry (MS) unit 12, an analysis control unit 3 that controls operations of the GC unit 11 and the MS unit 12, respectively, a data processing unit 4 that processes data collected by the measurement unit 1, a control unit 5 that controls the entire system, and an input unit 6 and a display unit 7 connected to the control unit 5. The data processing unit 4 includes, as functional blocks, a data storage unit 41, a chromatogram creation unit 42, a quantitative analysis unit 43, and a saccharide quantitative database 44. The MS unit 12 may be either a mass spectrometer that performs normal mass spectrometry without an ion dissociation operation or a tandem mass spectrometer capable of MS/MS analysis or MS" analysis.

The saccharide quantitative database 44 stores GC analysis conditions, MS analysis conditions, and calibration curve information for each food category. The GC analysis conditions include, for example, a flow rate program of a carrier gas and a temperature program of a column oven, which are general GC analysis conditions, and a retention time of each saccharide (compound) to be quantified. The MS analysis conditions include, for example, a measurement mode (positive and negative polarities, voltage applied to each part, and the like), an m/z value of a monitoring ion, a confirmation ion ratio of each saccharide to be quantified, and the like. As described above, these analysis conditions are usually determined to be the same as analysis conditions at the time of preparing the calibration curve. As described above, the calibration curve information for each food category is, for example, calibration curve information for each of compounds a, b, . . . corresponding to each food category created by a device manufacturer.

In general, the analysis control unit 3, the data processing unit 4, and the control unit 5 can be configured such that a personal computer including a CPU, a memory, and the like or a computer having higher performance called a workstation is used as hardware, and by executing dedicated processing and control software (computer program) installed in advance in the computer on the computer, at least a part of functions of the computer program is realized. The saccharide quantitative database 44 may be included in the processing and control software, but may be another software for saccharide quantitative analysis.

The above-described computer program can be provided to a user by being stored in a non-transitory computer-readable recording medium such as a CD-ROM, a DVD-ROM, a memory card, or a USB memory (dongle). Further, the program can be provided to the user in the form of data transfer via a communication line such as the Internet. Furthermore, the program can be pre-installed in a computer that is a part of the system (strictly, a storage device that is a part of the computer) when the user purchases the system.

A procedure and an operation of quantifying a saccharide in a target sample (food sample) using the saccharide quantitative analysis system will be described.

The user sets the target sample in the preprocessing device 2, and performs preprocessing according to the procedure already exemplified by the preprocessing device 2 (step S11). Here, it is assumed that the preprocessing device 2 automatically performs the preprocessing by the procedure as described above, but the user may manually perform the preprocessing. In this preprocessing, a predetermined concentration of an internal standard substance is added to the target sample, and the saccharide (compound) in the target sample is derivatized.

Before the measurement unit 1 performs the GC/MS analysis on the preprocessed target sample, the user performs a predetermined operation on the input unit 6 to select a food category including the target sample (step S12). That is, the control unit 5 creates a screen showing a list of a plurality of food categories stored in the saccharide quantitative database 44 and displays the screen on the display unit 7, and the user selects one food category by the input unit 6 by looking at the screen. In the example illustrated in FIG. 1 (and FIG. 3), five food categories of meat, fish, vegetables, root vegetables, and grains are illustrated as the food categories, and the user selects one of them. The control unit 5 receives selection of the food category by the user.

Upon receiving the selection of the food category, the quantitative analysis unit 43 in the data processing unit 4 acquires calibration curve information of each compound associated with the selected food category from the saccharide quantitative database 44 (step S13). Further, the analysis control unit 3 acquires the information of GC analysis condition and the MS analysis condition from the saccharide quantitative database 44 (step S14).

For example, upon receiving an instruction from the user, the analysis control unit 3 controls each of the GC unit 11 and the MS unit 12 according to the acquired information of GC analysis condition and MS analysis condition, and executes the GC/MS analysis on the preprocessed target sample (step S15). As the analysis proceeds, data obtained by the MS unit 12 is input to the data processing unit 4 and stored in the data storage unit 41.

Thereafter, the chromatogram creation unit 42 reads the data from the data storage unit 41 to create an extracted ion chromatogram corresponding to each compound, and identifies each compound using the retention time and the confirmation ion ratio of each compound. That is, it is confirmed whether or not the detected compound is the target compound. Then, when the target compound is detected, the quantitative analysis unit 43 calculates an area ratio of peaks observed in the extracted ion chromatogram with respect to the target compound and the internal standard substance, and calculates a quantitative value (concentration value) by comparing a value of the area ratio with the calibration curve of the compound (step S16). The control unit 5 displays the quantitative value for each target compound on the display unit 7 as a quantitative analysis result.

Thus, in this saccharide quantitative analysis system, concentration values of various saccharides contained in the target sample can be obtained without performing any operation of creating a calibration curve on a user side.

In the above description, the saccharide quantitative database 44 stores the calibration curve information created by actually analyzing one food sample included in the food category, but this calibration curve information can be appropriately adjusted. That is, instead of the calibration curve information for a certain one type of food sample, for example, calibration curve information created by actually analyzing a plurality of types of food samples included in the same food category may be used, and statistical processing such as averaging the calibration curve information may be performed to obtain final calibration curve information. By mean of this, overall or average quantitative accuracy can be improved for various food samples included in one food category. Of course, the user does not need to be conscious of what method or what algorithm has created the calibration curve information.

[Experimental Result of Quantitative Analysis]

In the quantitative analysis method of the present embodiment, in most cases, the type of the food to be subjected to the quantitative analysis is different from the type of the food when the calibration curve information stored in the saccharide quantitative database 44 is created. Therefore, in order to confirm that the calibration curve information can be used for foods included in the same food category even if the kinds of foods are different, the following experiment was performed.

First, strawberry, which is one of fruity vegetables, was used for the food category of vegetables, and wheat was used for the food category of grains, and calibration curve information was created according to the procedure described above for each of the plurality of saccharides. The saccharides to be quantified here are meso-erythritol, rhamnose, fucose, lipose, mannitol, trehalose, maltose, and isomaltose.

Tomato included in the food category of vegetables was prepared as a target sample, 50 ng of each of the saccharides was added to the sample, and then preprocessing was performed. The preprocessed sample was subjected to the GC/MS analysis, and a quantitative value of each saccharide was calculated from the resulting data using the calibration curve information of each of the food category of vegetables and the food category of grains. However, the concentration of the saccharide originally contained in the target sample is separately measured, and a quantitative value corresponding to the amount of 50 ng added is obtained by subtracting the concentration.

FIG. 4 illustrates a quantitative result using calibration curve information in the food category of vegetables (the food sample at the time of creating the calibration curve is strawberry). FIG. 5 illustrates a quantitative result using calibration curve information in the food category of grains (the food sample at the time of creating the calibration curve is wheat).

As illustrated in FIG. 4, the accuracy of the quantitative values obtained using the calibration curve information in the same food category is within 100±5%. On the other hand, as illustrated in FIG. 5, the accuracy of the quantitative values obtained using the calibration curve information in different food categories is deviated by 15% or more in mannitol, trehalose, maltose, and isomaltose. This discrepancy is presumed to be caused by the influence of the matrix due to the difference in the type of food. In other words, by appropriately defining a plurality of food categories so as to include foods having similar degrees of influence of the matrix, it can be said that practically sufficient quantification accuracy can be secured even if the target sample is quantified using calibration curve information associated with each food category and created using a food sample of a type different from the target sample.

The above-described embodiments and modifications are merely an example of the present invention, and, as a matter of course, appropriate changes, modifications, and additions which are made within the scope of the gist of the present invention are also included in the scope of the claims of the present application.

For example, in the above embodiments, the sample is a food product, but as described above, a biological sample such as blood may be targeted. In that case, it is a matter of course that the category is appropriately changed accordingly. Further, the organic compound to be quantified may be not only a saccharide but also a fatty acid, an amino acid, or the like. When these compounds are subjected to the GC analysis, derivatization is well known, and a preprocessing method can be selected according to the compounds.

[Various Modes]

It will be understood by those skilled in the art that the exemplary embodiments described above are specific examples of the following modes.

(Clause 1) One mode of a quantitative analysis method according to the present invention is a quantitative analysis method of quantifying a target compound contained in a sample derived from an organism, the quantitative analysis method including:
- a category selection step of receiving selection by a user of one category including a target sample from among a plurality of categories determined in advance for the sample;
- a preprocessing step of performing a predetermined preprocessing including derivatization on the target sample;
- a measurement execution step of executing gas chromatograph mass spectrometry on a preprocessed target sample preprocessed by the preprocessing step based on analysis condition information provided from a database storing the analysis condition information for the gas chromatograph mass spectrometry and calibration curve information for quantification by a standard addition method for each of the plurality of categories; and
- a quantitative processing step of performing quantitative processing based on data obtained in the measurement execution step using the calibration curve information corresponding to the category selected in the category selection step, the calibration curve information being provided by the database.

(Clause 8) Further, one mode of a quantitative analysis apparatus according to the present invention is a quantitative analysis apparatus configured to quantify a target compound contained in a sample derived from an organism, the quantitative analysis apparatus including:
- a database storing analysis condition information for gas chromatograph mass spectrometry and calibration curve information for quantification by a standard addition method for each of a plurality of categories determined in advance for the sample;
- a category selection unit configured to receive selection by a user of one category including a target sample from among the plurality of categories;
- a measurement unit configured to execute the gas chromatograph mass spectrometry on the target sample subjected to predetermined preprocessing based on the analysis condition information provided by the database; and
- a quantitative processing unit configured to perform quantitative processing based on data obtained by the measurement unit using the calibration curve information corresponding to one category selected by the category selection unit provided by the database.

According to the quantitative analysis method described in Clause 1 and the quantitative analysis apparatus described in Clause 8, it is possible to reduce the burden of sample preparation and analysis work required for creating a calibration curve by the standard addition method for each unknown sample and each target compound, which is complicated and troublesome and time consuming for the user, while securing practically sufficient quantitative accuracy. Thereby, for example, quantitative analysis of a plurality of kinds of saccharides with respect to a large amount of unknown samples can be performed in an efficient and labor-saving manner.

(Clause 2) In the quantitative analysis method described in Clause 1, the sample may be a food product derived from an organism.

According to the quantitative analysis method described in Clause 2, for example, it is effective to search for an organic compound useful for a human body included in various foods.

(Clause 3) In the quantitative analysis method described in Clause 2, the target compound may be a saccharide.

According to the quantitative analysis method described in Clause 3, it is possible to simultaneously quantify a plurality of kinds of saccharides contained in food.

(Clause 4) In the quantitative analysis method described in Clause 2 or Clause 3, the plurality of categories may be a grouping of agricultural products, livestock products, and marine products, or a grouping obtained by further subdividing at least one of them.

According to the quantitative analysis method described in Clause 4, quantitative accuracy can be enhanced by putting foods having close matrix effects into the same category.

(Clause 5) In the quantitative analysis method described in any one of Clause 1 to Clause 4, the calibration curve information may be calibration curve information based on a standard addition method and an internal standard method, the calibration curve information being created using a ratio of an area or a height of chromatography peaks between a predetermined internal standard substance added to a sample during preprocessing and a target compound added to the sample, and
- in the preprocessing step, the internal standard substance may be added to the target sample, and in the quantitative processing step, a quantitative value can be obtained from an area ratio or a height ratio of the chromatography peaks between the internal standard substance and the target compound.

According to the quantitative analysis method described in Clause 5, it is possible to correct a quantitative error caused by a difference in a recovery rate of the compound during the reprocessing of the sample, a difference in a supply amount when the sample is supplied to the gas chromatograph, and the like. As a result, for example, even when derivatization with a large variation in recovery rate is performed, the quantitative accuracy can be improved.

(Clause 6) In the quantitative analysis method described in any one of Clause 1 to Clause 5, the calibration curve information for a specific target compound may be created by the standard addition method using a stable isotope of the target compound containing deuterium or carbon 13 having a relatively low abundance ratio.

According to the quantitative analysis method described in Clause 6, it is possible to avoid a concentration range of the calibration curve from becoming too wide and to improve the accuracy of the calibration curve for a compound whose concentration contained in the sample is originally high.

(Clause 7) In the quantitative analysis method described in any one of Clause 1 to Clause 6, the target compound may be a saccharide, the preprocessing step may include: an extraction step of obtaining an extraction sample in which a compound contained in the sample is extracted into a solvent; and a derivatization step of performing derivatization on the extraction sample, and in the derivatization step, an operation of adding an aprotic solvent such as dimethyl sulfoxide and stirring and an operation of adding at least acetic anhydride and stirring may be performed.

According to the quantitative analysis method described in Clause 7, generation of isomers that are likely to be generated when a saccharide is preprocessed is prevented, and chromatographic peaks corresponding to the target compound are collected, whereby quantitativity can be enhanced.

REFERENCE SIGNS LIST

1 . . . Measurement Unit
11 . . . GC Unit
12 . . . MS Unit
2 . . . Preprocessing Device
3 . . . Analysis Control Unit
4 . . . Data Processing Unit
41 . . . Data Storage Unit
42 . . . Chromatogram Creation Unit
43 . . . Quantitative Analysis Unit
44 . . . Saccharide Quantitative Database
5 . . . Control Unit
6 . . . Input Unit
7 . . . Display Unit

The invention claimed is:

1. A quantitative analysis method of quantifying a target compound contained in a sample derived from an organism, the quantitative analysis method comprising:
   a category selection step of receiving selection by a user of one category including a target sample from among a plurality of categories determined in advance for the sample;
   a preprocessing step of performing a predetermined preprocessing including derivatization on the target sample;
   a measurement execution step of executing gas chromatograph mass spectrometry on a preprocessed target sample preprocessed by the preprocessing step based on analysis condition information provided from a database storing the analysis condition information for the gas chromatograph mass spectrometry and calibration curve information for quantification by a standard addition method for each of the plurality of categories; and
   a quantitative processing step of performing quantitative processing based on data obtained in the measurement execution step using the calibration curve information corresponding to the category selected in the category selection step, the calibration curve information being provided by the database.

2. The quantitative analysis method according to claim 1, wherein the sample is a food product derived from an organism.

3. The quantitative analysis method according to claim 2, wherein the target compound is a saccharide.

4. The quantitative analysis method according to claim 2, wherein the plurality of categories are a grouping of agricultural products, livestock products, and marine products, or a grouping obtained by further subdividing at least one of them.

5. The quantitative analysis method according to claim 1, wherein the calibration curve information is calibration curve information based on a standard addition method and an internal standard method, the calibration curve information being created using a ratio of an area or a height of chromatography peaks between a predetermined internal standard substance added to a sample during preprocessing and a target compound added to the sample, and
   in the preprocessing step, the internal standard substance is added to the target sample, and in the quantitative processing step, a quantitative value is obtained from an area ratio or a height ratio of the chromatography peaks between the internal standard substance and the target compound.

6. The quantitative analysis method according to claim 1, wherein the calibration curve information for a specific target compound is created by the standard addition method using a stable isotope of the target compound containing deuterium or carbon 13 having a relatively low abundance ratio.

7. The quantitative analysis method according to claim 1, wherein the target compound is a saccharide, the preprocessing step includes: an extraction step of obtaining an extraction sample in which a compound contained in the sample is extracted into a solvent; and a derivatization step of performing derivatization on the extraction sample, and in the derivatization step, an operation of adding an aprotic solvent and stirring and an operation of adding at least acetic anhydride and stirring are performed.

8. A quantitative analysis apparatus configured to quantify a target compound contained in a sample derived from an organism, the quantitative analysis apparatus comprising:
   a database storing analysis condition information for gas chromatograph mass spectrometry and calibration curve information for quantification by a standard addition method for each of a plurality of categories determined in advance for the sample;
   a category selection unit configured to receive selection by a user of one category including a target sample from among the plurality of categories;
   a measurement unit configured to execute the gas chromatograph mass spectrometry on the target sample subjected to predetermined preprocessing based on the analysis condition information provided by the database; and
   a quantitative processing unit configured to perform quantitative processing based on data obtained by the measurement unit using the calibration curve information corresponding to one category selected by the category selection unit provided by the database.

* * * * *